United States Patent
Inadate

(10) Patent No.: US 7,334,260 B1
(45) Date of Patent: Feb. 19, 2008

(54) INFORMATION PROCESSING APPARATUS AND METHOD, AND RECORDING MEDIUM ON WHICH A PROGRAM FOR EXECUTING THE INFORMATION PROCESSING IS RECORDED

(75) Inventor: Toshio Inadate, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/575,864

(22) Filed: May 19, 2000

(30) Foreign Application Priority Data

May 21, 1999 (JP) ................................. 11-142164

(51) Int. Cl.
*H04L 29/00* (2006.01)

(52) U.S. Cl. .............................. 726/12; 726/4; 726/17; 726/21; 705/26; 705/27; 705/80

(58) Field of Classification Search ................ 713/155, 713/168–170, 201; 705/1, 10, 14, 26, 27, 705/37, 80; 726/4, 7, 12, 17, 21
See application file for complete search history.

(56) References Cited

U.S. PATENT DOCUMENTS

| | | | | |
|---|---|---|---|---|
| 4,799,156 A | * | 1/1989 | Shavit et al. | 705/26 |
| 5,548,722 A | * | 8/1996 | Jalalian et al. | 709/220 |
| 5,589,892 A | * | 12/1996 | Knee et al. | 725/43 |
| 5,757,917 A | * | 5/1998 | Rose et al. | 705/79 |
| 5,758,328 A | * | 5/1998 | Giovannoli | 705/26 |
| 5,794,207 A | * | 8/1998 | Walker et al. | 705/1 |
| 5,835,087 A | * | 11/1998 | Herz et al. | 715/810 |
| 5,862,223 A | * | 1/1999 | Walker et al. | 705/50 |
| 5,940,807 A | * | 8/1999 | Purcell | 705/26 |
| 6,112,181 A | * | 8/2000 | Shear et al. | 705/1 |
| 6,131,087 A | * | 10/2000 | Luke et al. | 705/26 |
| 6,199,754 B1 | * | 3/2001 | Epstein | 235/379 |
| 6,260,024 B1 | * | 7/2001 | Shkedy | 705/37 |
| 6,338,138 B1 | * | 1/2002 | Raduchel et al. | 713/155 |
| 6,466,919 B1 | * | 10/2002 | Walker et al. | 705/37 |
| 6,598,026 B1 | * | 7/2003 | Ojha et al. | 705/26 |
| 6,604,127 B2 | * | 8/2003 | Murphy et al. | 709/203 |
| 6,625,581 B1 | * | 9/2003 | Perkowski | 705/27 |
| 6,633,549 B1 | * | 10/2003 | Fedane | 370/264 |

FOREIGN PATENT DOCUMENTS

WO    WO 94/23383    * 10/1994

* cited by examiner

*Primary Examiner*—Kambiz Zand
*Assistant Examiner*—Tongoc Tran
(74) *Attorney, Agent, or Firm*—Finnegan, Henderson, Farabow, Garrett & Dunner, L.L.P.

(57) ABSTRACT

An agent server registers a request information for purchasing from an authorized member in a request information data base by way of the Internet. The request information stored in the request information data base is searched by an authorized shop, and the shop serves related goods information available to the authorized member. In this way a direct sale of goods is done with high reliability on the Internet between the authorized member and the authorized shop.

16 Claims, 16 Drawing Sheets

FIG. 4

USER ID  ××@×32
NAME  TAROU SUMA
ADDRESS  123, SHINAGAWA-KU, TOKYO

CATEGORY  ▼
SEX・AGE
OBJECT  ▼
TRADE NAME
COMMENT

DATE  ▼
PRICE  ▼

REQUEST LIST     OK
      22          21

FIG. 5

△ BAG OF ××× 99/1/20   SUZUKI, TOKYO
● PURSE OF ○○○ 99/1/21 YAMADA, TOKYO
WITHIN ONE WEEK, 50,000 YEN ( DELETE )
31

FIG. 9

| | |
|---|---|
| CATEGORY | BAG |
| SEX・AGE | FEMAIL, TWENTIES |
| OBJECT | FOR TRAVEL |
| TRADE NAME | BAG OF ○○○ |
| COMMENT | LIGHT ONE |
| DATE | WITHIN THIS MONTH |
| PRICE | UNDER 30,000 YEN |

OFFER

------------ —62

(SUBMIT)
      \
       61

FIG. 11

```
DEAR SUMA

THANK YOU FOR USING THIS SERVICE

SERVICE MEMBER SHOP : YOUNGER'S

─────── ▼ YOUR RERQUEST INFORMATION ▼ ───────
    REQUEST NO.  : 000400015
    OBJECT       : FOR KIDS
    TRADE NAME   : STEEL SIDE-CHEST 270944 (YELLOW)
    PRICE        : UP TO 30,000 YEN
    ------------------------------------------------
                          ▼
                          ▼
    ================================================
            ◆◆ CONTENT OF OFFER ◆◆
    ================================================
    THERE ARE REQUESTED GOODS
    PRICE IS 25,000 YEN

┌──────────────────────────────────────┐
         │ ★ DIRECT PURCHASE URL : http://abc.de.jp │
         └──────────────────────────────────────┘
```

FIG. 13

| TRADE NAME | AMOUNT | PRICE |
|---|---|---|
| CHEST | 1 | 25,000 |

ID [          ]

(PURCHASE OK) —71
(CANCEL) —72

FIG. 16

CONTENT OF REQUEST

REGISTRATION DATE
EFFECTIVE DATE
OBJECT              FOR KIDS
TRADE NAME          CHILD SHEET (WEAR TYPE)
COMMENT
PRICE

OFFER

TITLE               WEAR TYPE CHILD SHEET
URL                 http://homepage1.com/ia-blue/
OFFER               INTRODUCE SHOP SELLING
                    WEAR TYPE CHILD SHEET
SHOP                POKO21
DIRECT PURCHASE URL    http://abc.ne.jp/buy

INFORMATION PROCESSING APPARATUS AND METHOD, AND RECORDING MEDIUM ON WHICH A PROGRAM FOR EXECUTING THE INFORMATION PROCESSING IS RECORDED

BACKGROUND OF THE INVENTION

1. Field of the Invention

This invention relates to an information processing apparatus and method, and recording medium, and more particularly to such information processing apparatus that is able to offer high quality goods information to a person who wants to purchase. This invention also related to a method for processing such information service and also to a recording medium on which a program for executing such information service is recorded.

2. Description of the Related Art

For example, a user who wants to purchase some goods can search internet home-pages with trade names of the goods on the Internet using a search engine, and is able to obtain various information about the goods (for example, shop name or price) all over the world.

Furthermore, a user who wants to purchase some goods can register a message stating that the user is looking for information service for some goods for purchasing on a BBS (Bulletin Board System), and waits a response from a person who checks that message on the BBS. Within a short time, the user can get many information about the goods from the member of the BBS.

However, in the former method using the search engine as stated above, the number of shopper's home-pages on the Internet is so enormous as a search result that it is very difficult to find out a suitable shopper's home-page among them, and sometime it takes long time and these may be wrong information in case.

Further in the case of the Bulletin Board System, the response reporting such goods information is registered on the condition of anonymity, so that the reliability of these response information is uncertain.

Namely in both conventional cases, it is very difficult to maintain a quality of information submitted thereto.

SUMMARY OF THE INVENTION

It is a primary object of this invention to present a new information processing apparatus and method, and particularly to such an apparatus or a method in which a user is able to get suitable information from others.

It is a secondary object of this invention to present a novel information service apparatus and a method that is able to offer a high quality goods information to a user who wants to purchase it by way of the Internet.

It is further object of this invention to present a recording medium on which a program for executing such new information service is recorded.

According to the present invention, an information processing apparatus to be connected to a plurality of information terminals by way of an network, comprises, a plurality of information terminals, means for storing user information of each of information terminals, authentication means for authenticating the information terminal of a user based on the user information stored in the storing means, means for recording a request information entered from the information terminal of the first user authenticated by the authentication means, means for searching the request information recorded by the recording means in response to a demand entered from the information terminal of the second user authenticated by the authentication means, means for transmitting request information obtained as a search result to said information terminal of the second user, and means for transferring a service information corresponding to the request information as the search result to the information terminal of the first user, wherein the service information being entered from the information terminal of the second user.

Further in the information processing apparatus of this invention, the user information includes an user ID, a password and an electronic mail address.

The transferring means transfers the service information corresponding to the request information as the search result to the information terminal of the first user by an electronic mail based on the user information for the first user stored in the storing means in the information processing apparatus.

The service information of the present invention may include an address information on the network for obtaining a desired information among the service information by the first user.

The information processing apparatus of this invention further comprises, means for supplying a list of the request information recorded by the recording means to the information terminal of the second user in response to a demand entered from the information terminal of the second user.

In the information processing apparatus of this invention, wherein the recording means records the service information corresponding to the request information, and the information processing apparatus further comprises, means for supplying the request information and the service information recorded by the recording means to the information terminal of the first user in response to a demand entered from the information terminal of the first user.

In the another aspect of this invention, method for processing information among a plurality of information terminals connected to an network is disclosed, wherein the method comprises the steps of, storing user information of the each of information terminals, authenticating the information terminal of a user based on the user information stored in the storing means, recording a request information entered from the information terminal of the first user authenticated by the authentication means, searching the request information recorded by the recording means in response to a demand entered from the information terminal of the second user authenticated by the authentication means, transmitting request information obtained as a search result to the information terminal of the second user, and transferring a service information corresponding to the request information as the search result to the information terminal of the first user, wherein the service information being entered from the information terminal of the second user.

Further another aspect of this invention, a computer-readable recording medium recorded a program for processing information among a plurality of information terminals connected to an network is disclosed, wherein the program comprises the steps of storing user information of the each of information terminals, authenticating the information terminal of a user based on the user information stored in the storing means, recording a request information entered from the information terminal of the first user authenticated by the authentication means, searching the request information recorded by the recording means in response to a demand entered from the information terminal of the second user authenticated by the authentication means, transmitting request information obtained as a search result to the information terminal of the second user, and transferring a service information corresponding to the request information as the search result to the information terminal of the first user, wherein the service information being entered from the information terminal of the second user.

BRIEF DESCRIPTION OF THE DRAWINGS

FIG. 4 shows one example of a page for request information registration.

FIG. 5 shows one example of a page for displaying a request information list.

FIG. 9 shows one example of a page having an offer information input column.

FIG. 11 shows on example of a content of the E-mail.

FIG. 13 shows one example of a page for purchasing goods at a step S41 in FIG. 12.

FIG. 16 shows a page for displaying detail at a step S63 in FIG. 14.

PREFERRED EMBODIMENTS OF THE INVENTION

Figure 1:
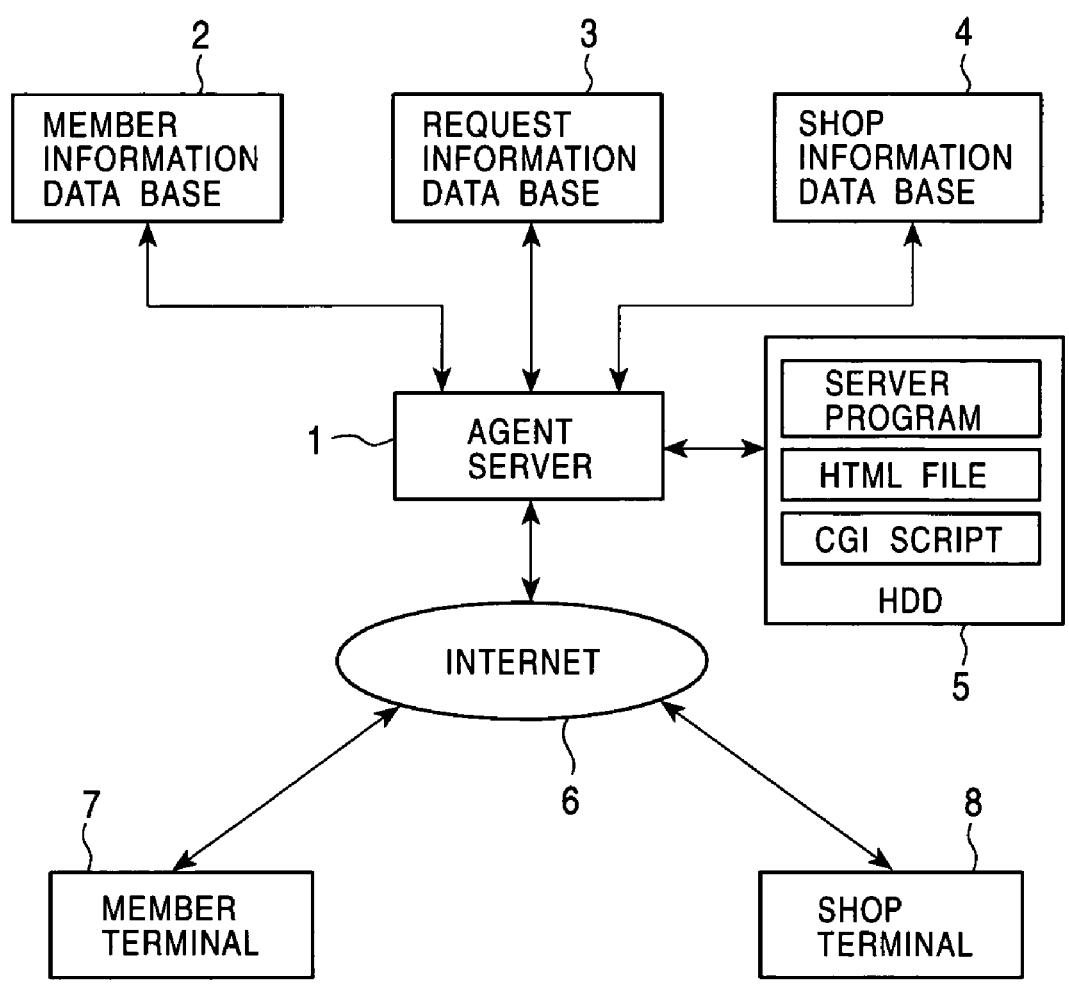
FIG. 1 shows a block diagram showing a constitutional example of the information service system to which this invention is applied.

FIG. 1 shows one embodiment of an information service apparatus to which this invention is applied. This information service apparatus comprises an agent server 1, a member terminal 7, and a shop terminal 8. These are coupled to each other by way of the Internet 6. Actually there are plurality of member terminals 7 and shop terminals 8, but they are omitted in this FIG. 1. A member information database 2, a request information data base 3 and a shop information data base 4 are respectively connected to the agent server 1.

In the member information data base 2, a set of member information such as a user identification (User ID), a password, a post office address, a full name, and an E-mail (Electronic Mail) address, etc. are recorded. In the request information data base 3, a set of a request information such as a trade name of goods, a due date and a request price are recorded, and in the shop information data base 4, a set of shop information such as a shop identification (Shop ID), a password and a category of selling goods are recorded for a previously registered shop. A hard disk 5 is also connected to the agent server 1.

The agent server 1 is a kind of computer, and a CPU (Central Processing Unit) in the agent server 1 executes a processing based on a server program and a CGI (Common Gateway Interface) script stored in the hard disk (HDD) 5. The member terminal 7 and the shop terminal 8 are also computers respectively, and a CPU in the respective member terminal 7 and shop terminal 8 executes a WWW (World Wide Web) browsing program stored in a respective installed recording medium.

An operation of this preferred embodiment of the present invention is explained next. When the WWW browsing program executed at the member terminal 7 (or at the shop terminal 8) accesses to an agent server home page based on a command from a user, the server program executed at the agent server 1 transmits a HTML (Hyper Text Markup Language) file stored in the hard disk 5 by way of the Internet 6 to the member terminal 7 (or the shop terminal 8), wherein the HTML file is used for displaying the aforementioned agent server home page.

The WWW browsing program executed at the member terminal 7 (or the shop terminal 8) receives the HTML file from the agent server 1, and displays an image corresponding to the HTML file on a computer monitor screen (not shown here).

On the agent server home page thus displayed on the computer monitor display of the member terminal 7, there are provided an input dialog box to which the user can enter a predetermined information, and an execute button that is pushed when the entered information is transmitted to the agent server 1. The detail of this operation is explained later.

When the user of the member terminal 7 enters predetermined information to the input dialog box on the agent server home page and pushes the execute button, the WWW browsing program of the member terminal 7 transmits the input information to the agent server 1 by way of the Internet 6.

In the agent server 1, a CGI script stored in the hard disk 5 is executed in accordance with the input information from the member terminal 7 as an argument. Specifically, the CGI script executes a authentication of a user of the member terminal 7 and the shop terminal 8. In addition, the CGI script registers the request information from the member terminal 7 in the request information data base 3.

Further the CGI script executes an information search based on a demand from the shop terminal 8 to the request information recorded in the request information data base 3 at the agent server 1, and transmits a search result to the shop terminal 8 from the agent server 1. And furthermore, the CGI script transmits a service information from the shop terminal 8 to the member terminal 7, wherein the service information is transmitted from the user of the shop terminal 8 who inspected the request information from the member terminal 7.

Next a request information registration processing is explained with reference to a flow chart of FIG. 2. In this case the user of the member terminal 7 is already finished a registration for a member ship of this request information service system, and the member information of the user of the member terminal 7 is recorded in the member information database 2 in advance.

When the WWW browsing program executed at the member terminal 7 accesses the URL (Uniform Resource Locator) of the agent server home page for the registered member in a step S1, the server program of the agent server 1 transmits a HTML file to the member terminal 7 by way of the Internet 6 in a step S2, where the HTML file displays a window promoting an input of the user ID and the password to the user of the member terminal 7. Namely, the WWW browsing program which received this HTML file executes to display the window on the monitor screen of the member terminal 7.

When the user of the member terminal 7 enters the user ID and the password into the displayed window on the monitor screen, and pushes an execution button (not shown), the WWW browsing program transmits the user ID and the password to the agent server 1 by way of the Internet 6.

The agent server 1 executes a CGI script for an authentication based on the transmitted user ID and the password as an argument in response to the reception of the user ID and the password from the member terminal 7. The CGI script for authentication checks whether the user ID and the password transmitted from the member terminal 7 are regular and being registered already in the member information database 2, and if they are authenticated, the process goes to a step S3.

Figure 3:
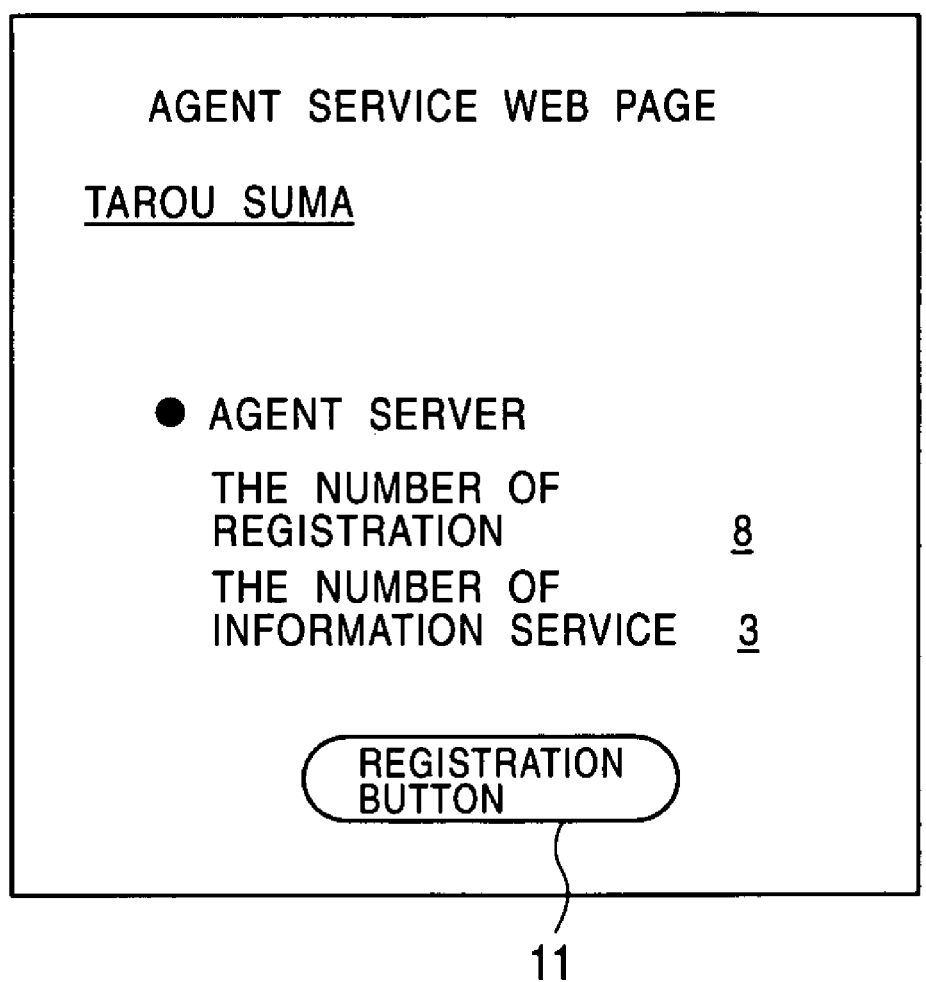
FIG. 3 shows one example of a top page for a member.

In the step S3, the CGI script for registration transmits a HTML file from the agent server 1 to the member terminal 7 for displaying a member top page as shown in FIG. 3 by way of the Internet 6. The WWW browsing program at the member terminal 7 displays this member top page on the monitor in accordance with the transmitted HTML file. In this case as shown in FIG. 3, the name of the user (Mr. Tarou Suma in FIG. 3) just authenticated by the member ID, the number of registration by this user (8 in FIG. 3), the number of information service to this user from the shop (3 in FIG. 3), and a registration button 11 linked to a registration page for entering request information are displayed on this member top page.

In a step S4, the WWW browsing program of the member terminal 7 judges if the registration button is pushed or not, and when it is judged that the registration button 11 is pushed, the process goes to a step S5.

In this step S5, the WWW browsing program of the member terminal 7 transmits an URL for the registration page linked to the registration button 11 to the agent server 1 by way of the Internet 6. The server program of the agent server 1 transmits a HTML file of a registration page corresponding to the entered URL to the member terminal 7 by way of the Internet 6. The WWW browsing program of the member terminal 7 displays an image corresponding to the input HTML file on the monitor display.

The user ID of the user, full name and the post office address are displayed on the top of the registration page on the monitor at the member terminal 7 as shown in FIG. 4. Further on this registration page, there are displayed a plurality of input dialog boxes for entering an information regarding goods to purchase, an OK button 21 for transmitting thus entered user information in the input dialog boxes to the agent server 1, and a request list button 22. The above information regarding goods to purchase includes a category of the goods, sex and age of the user, objects, trade name of the goods, comments of the user, the due date, and the price of the goods, and is called as a request information in this specification.

Then the user of the member terminal 7 enters the user's request information in the input dialog box of the registration page, and pushes the OK button 21 in a step S6, then the WWW browsing program of the member terminal 7 transmits this user's request information to the agent server 1 by way of the Internet 6.

In response to the request information transmitted from the member terminal 7, the agent server 1 executes a CGI script for registration of the request information, as the entered request information is argument. Namely, the CGI script regarding the registration for request information generates a HTML file for displaying the entered request information on the screen, and transmits this HTML file to the member terminal 7 by way of the Internet 6. Resultantly, the WWW browsing program of the member terminal 7 generates an image corresponding to the transmitted HTML file, and displays this image on the monitor of the member terminal 7.

When the user checked contents of this page and confirmed, the user who pushes an OK button on the monitor (not shown), thereby the WWW browsing program transmits acknowledgement to the agent server 1 by way of the Internet 6. The CGI script for the registration of the request information registers the request information entered at the step S6 into the request information data base 3.

FIG. 5 shows one example of a list of all of the request information registered in the request information data base 3 when the request list button 11 is pushed. The trade name of the goods to purchase, registration date, comment, post office address of the user, and the full name of the user are displayed on this display page. Once the information service is done from the shop terminal 8, a black circle (⁻) is put on the left side of the trade name of the goods, otherwise a white triangle (Δ) is put on as shown in FIG. 5. The user can select the request information registered by himself displayed on this display page, and eliminates thus selected request information from the request information data base 3 by pushing a delete button 31. On this display page, the request information having old due date is not displayed on this list. In FIG. 5, the underlined description [WITHIN ONE WEEK, 50,000 YEN] shows a title of a service information entered from the shop terminal 8.

A processing for searching the request information registered in the request information data base 3 by the shop terminal 8 is explained next with reference to a flow chart in FIG. 6. In this case the user of the shop terminal 8 is already registered in this information service system, and the shop information of the shop terminal 8 is recorded in the shop information database 4 in advance. It is very important in this system to restrictively examine a shop that wants to apply to this information service system before registration in the shop information database 4 in order to keep the reliability of the service information from the shop terminal 8.

When the WWW browsing program executed at the shop terminal 8 accesses to the URL of home page for shop managed by the agent server 1 in a step S11, then the server program of the agent server 1 transmits an HTML file for displaying an display page promoting the input of the shop ID and the password to the shop terminal 8 by way of the Internet 6 in a step S12. In response to the received this HTML file, the WWW browsing program executes to display the corresponding display page on the monitor of the shop terminal 8.

When the user of the shop terminal 8 enters the shop ID and the password into a dialog box, and pushes an execute button (not shown), the WWW browsing program executes to transmit these shop ID and the password to the agent server 1 by way of the Internet 6.

The agent server 1 executes a CGI script for authentication of the shop ID and the password transmitted from the shop terminal 8 as argument. Namely, the CGI script for authentication authenticates the shop ID and the password from the shop terminal 8 with the shop ID and the password registered in the shop information database 4. If it is authenticated, then the process proceeds to a step S13.

Figure 7:
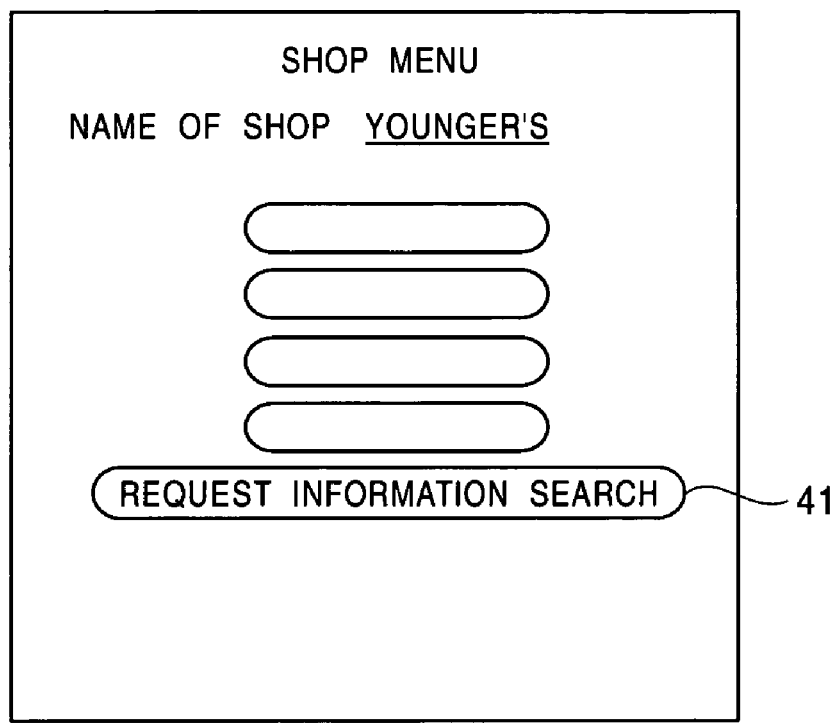
FIG. 7 shows one example of a top page for a shop.

In the step S13, the CGI script for authentication transmits the HTML file of the top page for the shop as shown in FIG. 7 to the shop terminal 8 by way of the Internet 6. The WWW browsing program of the shop terminal 8 displays on the monitor an image corresponding to the HTML file of the top page for the shop.

On the top page for the shop, the name of the shop corresponding to the authenticated shop ID, and a request information search button 41 to be pushed upon searching request information are displayed on the monitor of the shop terminal 8 as shown in FIG. 7.

In a step S14, the WWW browsing program of the shop terminal 8 judges whether the request information search button 41 is pushed or not. If the request information search button 41 is pushed, the process goes to a step S15.

In the step S15, the WWW browsing program of the shop terminal 8 transmits this information of the push of the request information search button 41 to the agent server 1 by way of the Internet 6. The agent server 1 executes a CGI script for search operation in response to the information of the push of the request information search button 41 from the shop terminal 8. The CGI script for search reads out a category of the goods of the corresponding shop from the shop information database 4, and searches desired information matching with the category of the goods as a search key among the request information stored in the request information data base 3. Furthermore, the CGI script for the search generates a HTML file for displaying thus searched information on the screen, and transmits this CGI script to the shop terminal 8 by way of the Internet 6. The WWW browsing program of the shop terminal 8 displays an image corresponding to this HTML file for displaying the search result as shown in FIG. 8.

Figure 8:
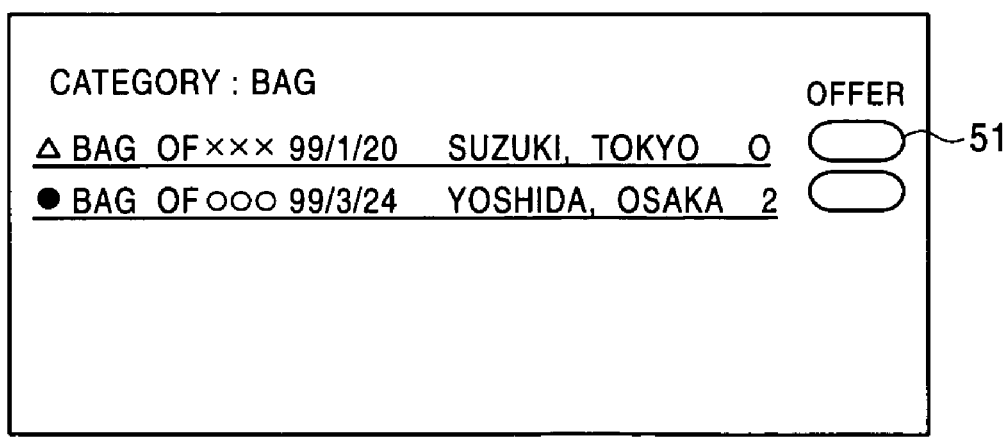
FIG. 8 shows one example of a page for displaying a search result.

The corresponding category of the goods such as a bag, for example, is displayed on the page for the search result as shown in FIG. 8. In addition to this category of the goods, a mark (Δ or ●) expressing absence or existence of information service from the shop, the trade name of the goods requested by the user (bag of XXX and bag of OOO in FIG. 8), registration date, user's comments, brief name and address of the user (Suzuki, Tokyo and Yoshida, Osaka in FIG. 8), the number of information service (0 and 2 in FIG. 8), and an offer button 51 are displayed on the monitor of the shop terminal 8 at each request information. The offer button 51 is pushed when another information service about the request information are requested.

In a step S16, the WWW browsing program of the shop terminal 8 checks if the offer button 51 is pushed or not, and if the button 51 is pushed, then the process proceeds to a step S17.

In this step S17, the WWW browsing program of the shop terminal 8 transmits the information of pushing the particular offer button 51 to the agent server 1 by way of the Internet 6. In response to this pushing information of the offer button 51 transmitted from the shop terminal 8, a CGI script for the search of the agent server 1 begins to read the request information corresponding to the particular offer button 51 from the request information data base 3. Further, the CGI script for search of the agent server 1 generates a HTML file for displaying detail of the request information derived from the request information data base 3, and transmits thus generated HTML file to the shop terminal 8 by way of the Internet 6. The WWW browsing program of the shop terminal 8 displays the image of the detail of the request information corresponding to the received HTML file for displaying detail of the request information as shown in FIG. 9.

In this case, below the detailed request information of the user, an offer box 62 and a submit button 61 are displayed on this image as shown FIG. 9.

In a step S18, the user of the shop terminal 8 enters service information such as address and telephone of the shop, the Home Page URL of the shop, stock condition of the goods, and price etc. in the offer dialog box 62. In a step S19, the WWW browsing program of the shop terminal 8 waits until the submit button 61 is pushed, and when the submit button 61 is pushed, the process proceeds to a step S20.

In the step S20, the WWW browsing program of the shop terminal 8 transmits the service information entered in the offer dialog box 62 from the shop terminal 8 to the agent server 1 by way of the Internet 6.

In response to the received service information from the shop terminal 8, agent server 1 executes a CGI script for transfer with the received service information as argument. Namely, the CGI script for transfer reads out an E-mail address of the user who registered the request information corresponding to the received service information from the member information data base 2, and transmits the service information to the E-mail address just read out. Further the CGI script for transfer adds the number of information service from the shop to the request information stored in the request information data base 3. Further the agent server 1 registers the entered service information in the request information data base 3 corresponding to the request information.

As described above, the user who wants to purchase some goods can get reliable goods information from the registered shop by E-mail according to one embodiment of the present invention. In this system, only the request information and brief address and name of the user are opened to the shop and the member information such as full post office address, full name, E-mail address and etc. are kept secret to the shop. Therefore, the privacy of the user is protected in this system. The shop can get more reliable request information, because the request information is come from only the registered member and further the shop can get user needs together with sex and age of the user on time. Thus obtained user request information is stored, so that the shop utilize this information to the sales strategy. The shop just has to prepare a personal computer for browsing the Home Page in order to use this information service system, so that additional advertisement cost or investments in equipment are not necessary.

In the embodiment of above described, the category of goods is used for search key among shop information registered by the shop, but it is possible for the shop to freely determine desirable search key upon searching.

In addition, it is possible to inform only E-mail address of the user who registered the request information to the shop. In this case, an E-mail is transmitted from the shop to the user without passing through the agent server 1, so that it is possible to avoid heavy processing load of the agent server 1.

Figure 6:
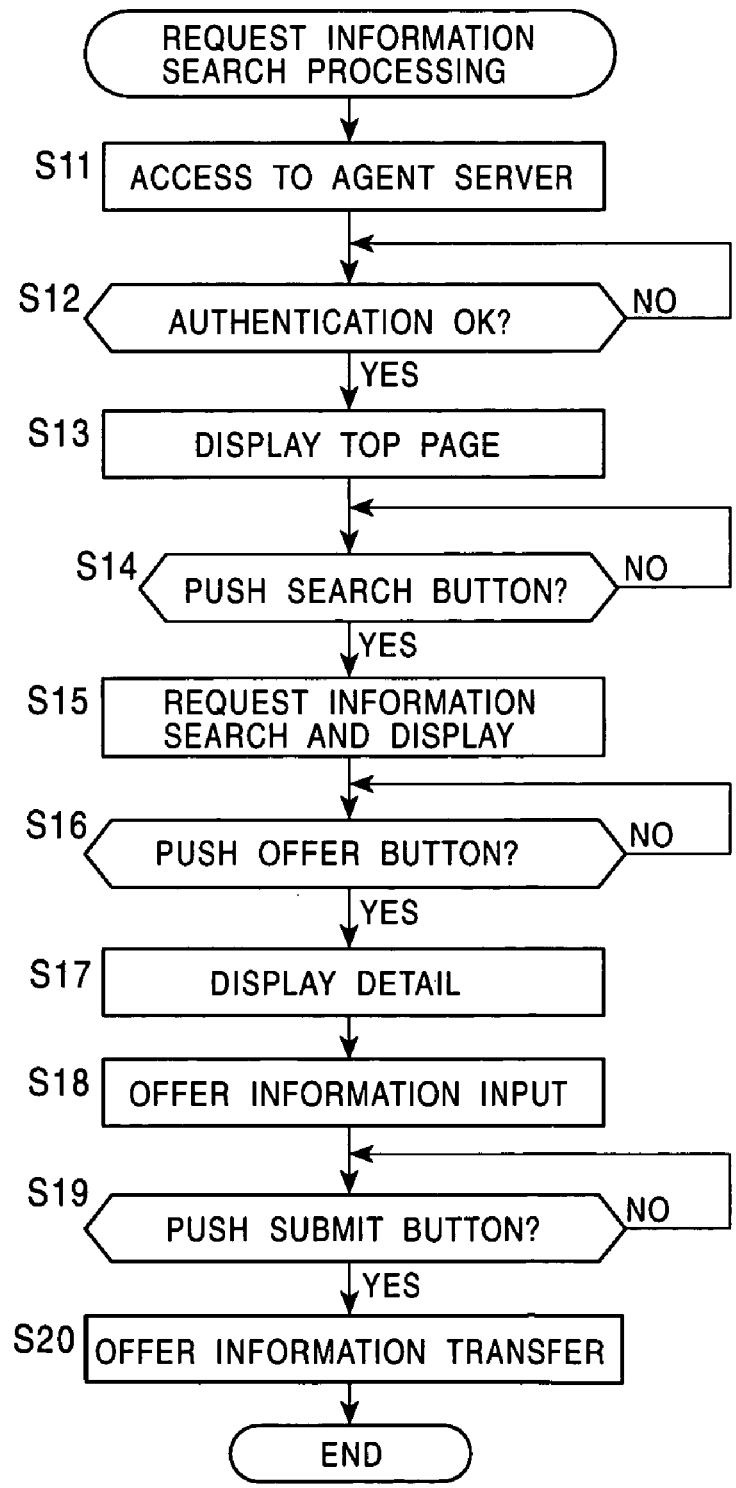
FIG. 6 shows a flow chart explaining request information search processing of the information service system.
Figure 10:
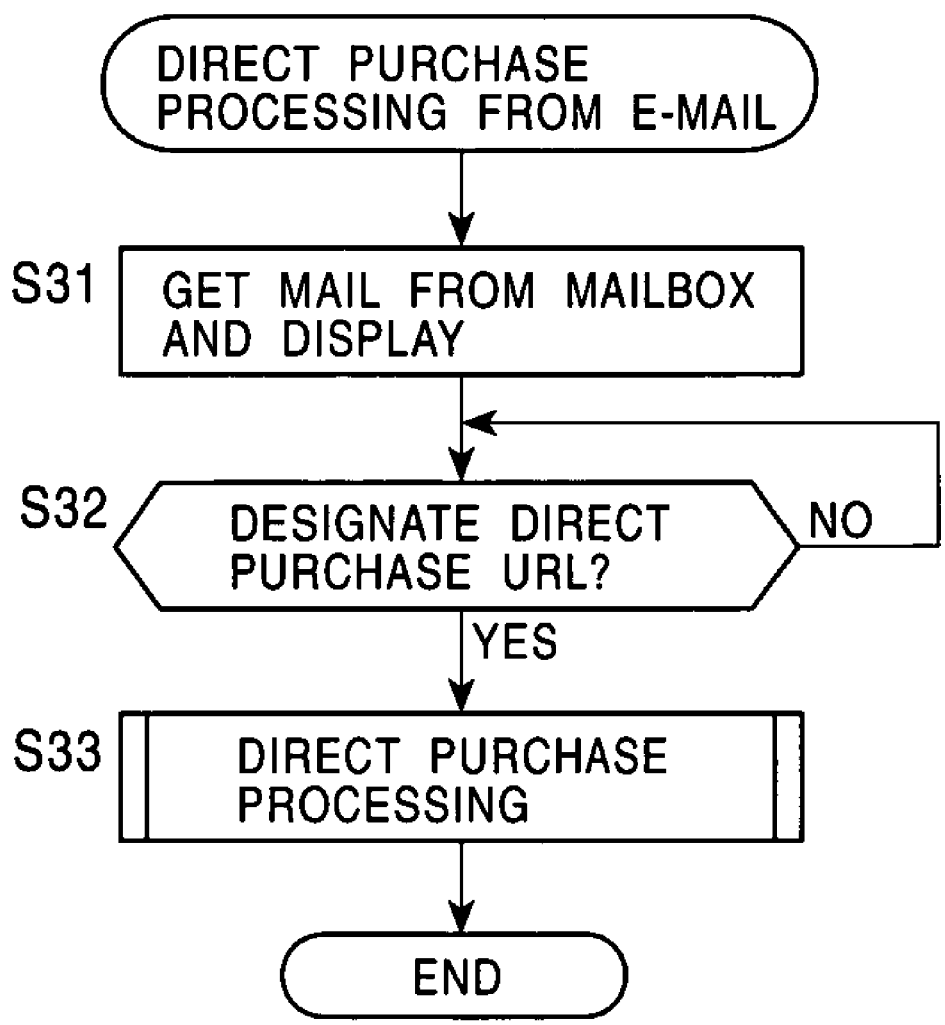
FIG. 10 shows a flow chart for explaining direct purchase processing by E-mail.

Further with reference to a flow chart of FIG. 10, a process for purchasing goods with regard to the service information transmitted from the shop by E-mail to the user at the step S6 in FIG. 6 is explained.

The user of the member terminal 7 starts an E-mail program. This E-mail program accesses, through the Internet 6, the user's mailbox provided in the agent server 1 at a step S31, and obtains incoming mails and displays the these mails. For example, a content of the mail as shown in FIG. 11 is displayed on the monitor of the member terminal 7.

In this example in FIG. 11, information regarding the request information such as a request number (000400015 in case of FIG. 11), object, trade name (steel side chest 270944 in FIG. 11) and price (up to 30,000 yen in FIG. 11) are displayed with reference to the goods requested by the user. Further with regard to the request information, the contents of the service information from the shop is displayed as an offer. In case of this FIG. 11, the shop named [Younger's] is selling this goods, and the price is 25,000 yen.

Further in this E-mail, a direct purchase URL address on the network for accessing a home page to buy the goods is displayed, and the user who wants to purchase the displayed goods served by the shop accesses to the URL of the direct purchasing.

Figure 12:
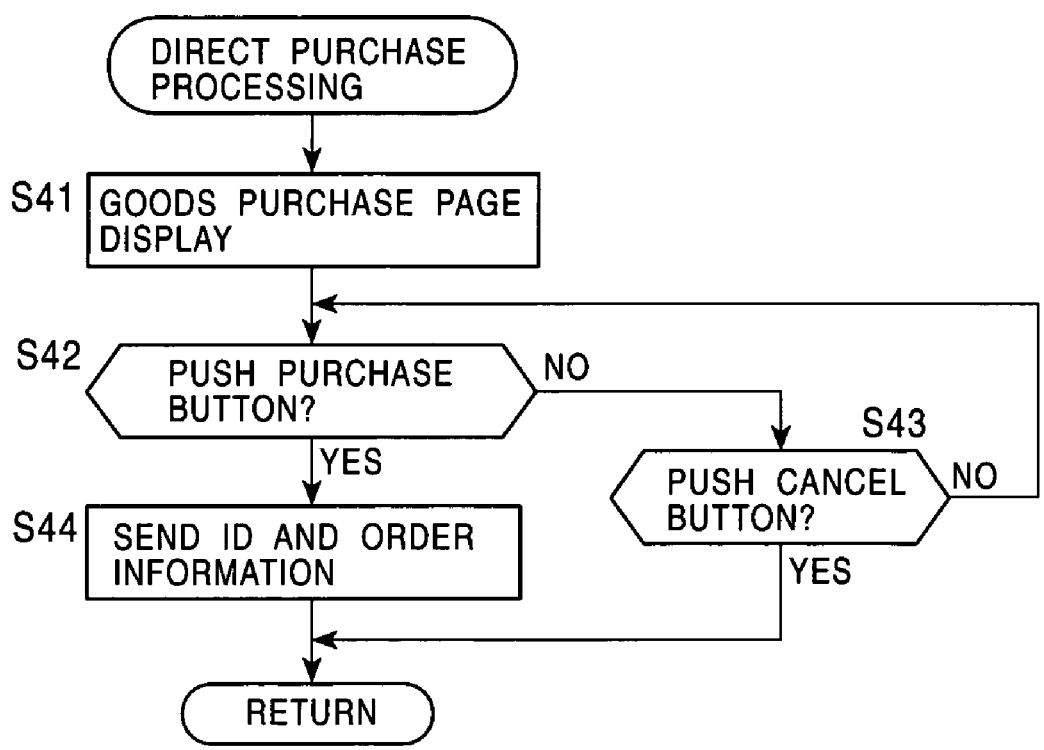
FIG. 12 shows a flow chart for explaining a detail of the direct purchase processing at a step S33 in FIG. 10.

Namely, the E-mail program waits at a step S32 until the direct purchasing URL is designated by the user, and when the direct purchasing URL is designated by the user, the process goes to a step S33 where the WWW browsing program starts for direct purchase processing. The direct purchase processing is explained more detail with reference to a flow chart in FIG. 12.

The WWW browsing program accesses to the direct purchasing URL by way of the Internet 6 at a step S41, and receives a HTML file. Thereby, the WWW browsing program receives the HTML file for displaying a purchasing page as shown in FIG. 13 by way of the Internet 6, the program displays the purchasing page.

In the example shown in FIG. 13. a trade name [chest] and a price [25,000] are displayed on this purchasing page. Further in this purchasing page, an input dialog box for amount of goods, an input dialog box for user ID, a purchasing OK button 71 to be pushed upon purchasing and a cancel button 72 to be pushed upon canceling are displayed. The user enters own user ID and amount when the user decided to purchase the chest with the listed price.

The WWW browsing program checks if the purchasing OK button 71 is pushed by the user at a step S42, and if it is not pushed, the process goes to a step S43, and then the WWW browsing program checks if the cancel button 72 is pushed. When the cancel button 72 is also not pushed, the process goes back to the step S42 and waits until ether the purchasing OK button 71 or the cancel button 72 is pushed.

If the purchasing OK button 71 is pushed at the step S42, the process goes to a step S44, and the WWW browsing program transfers the user ID and an order information including the trade name, price and amount to the agent server 1. The agent server 1 further transfers this order information to the shop terminal 8 by way of the Internet 6.

On the contrary, if the cancel button 71 is pushed at the step S43, the WWW browsing program quits the direct purchase processing.

As described above, the user can purchase desired goods immediately from the received E-mail.

Figure 14:
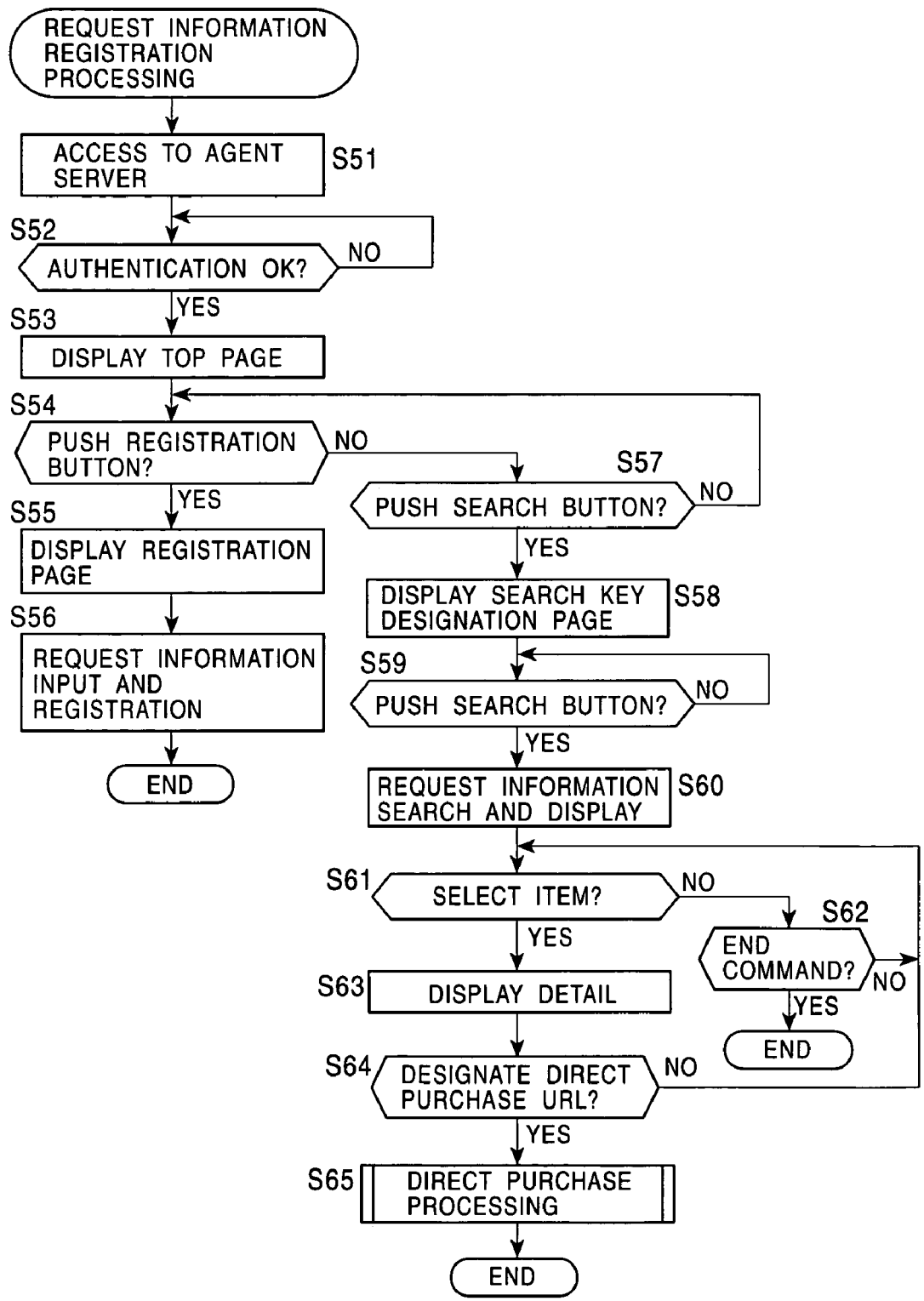
FIG. 14 shows a flow chart for explaining another example of the request information registration processing.

In the above described example, the request information is able to be searched from the shop terminal 8, but it is possible to search the request information from the member terminal 7. In FIG. 14, a flow chart for a request information registration processing is depicted.

Figure 2:
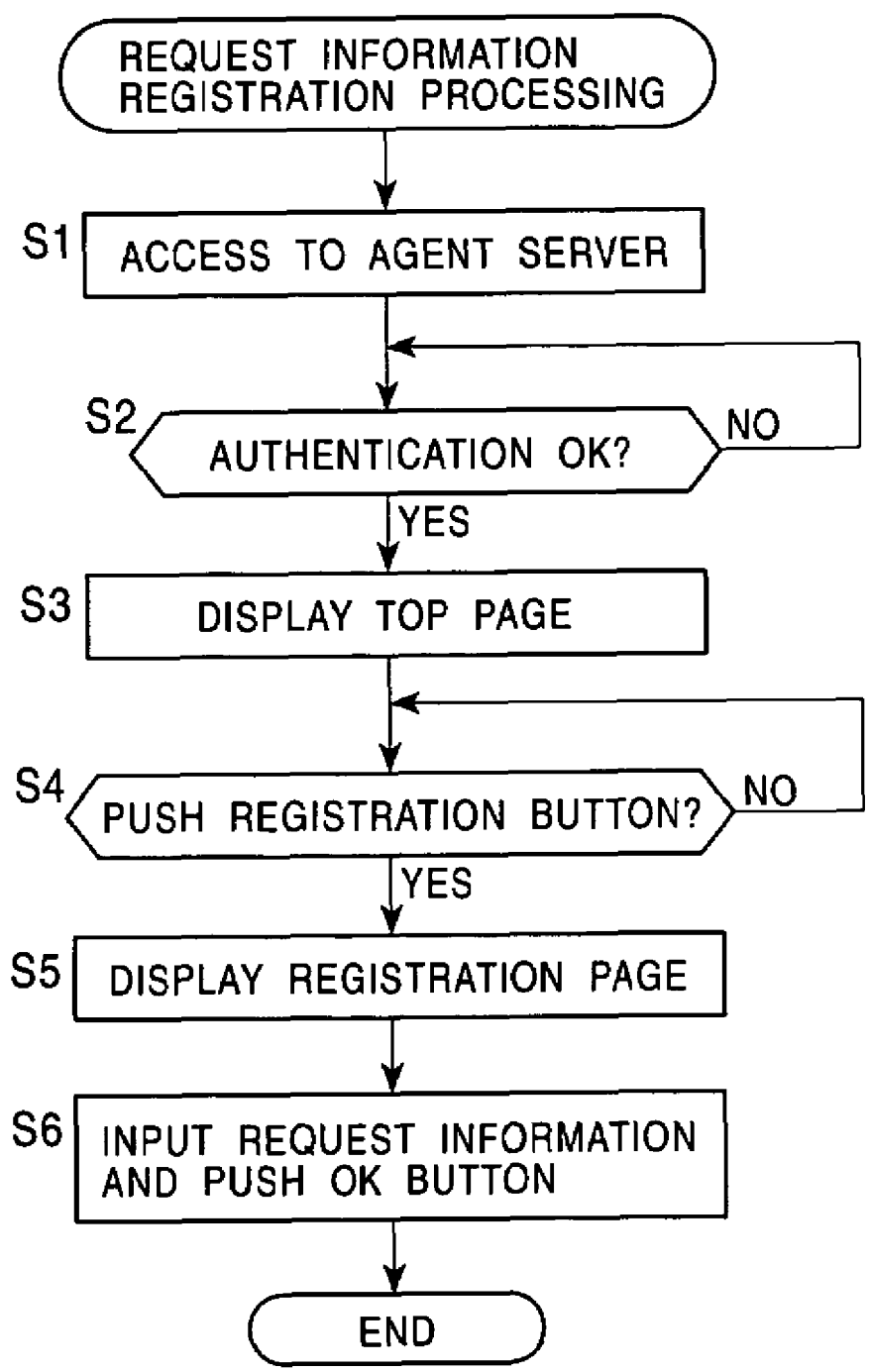
FIG. 2 shows a flow chart explaining request information registration processing of the information service system.
Figure 15:
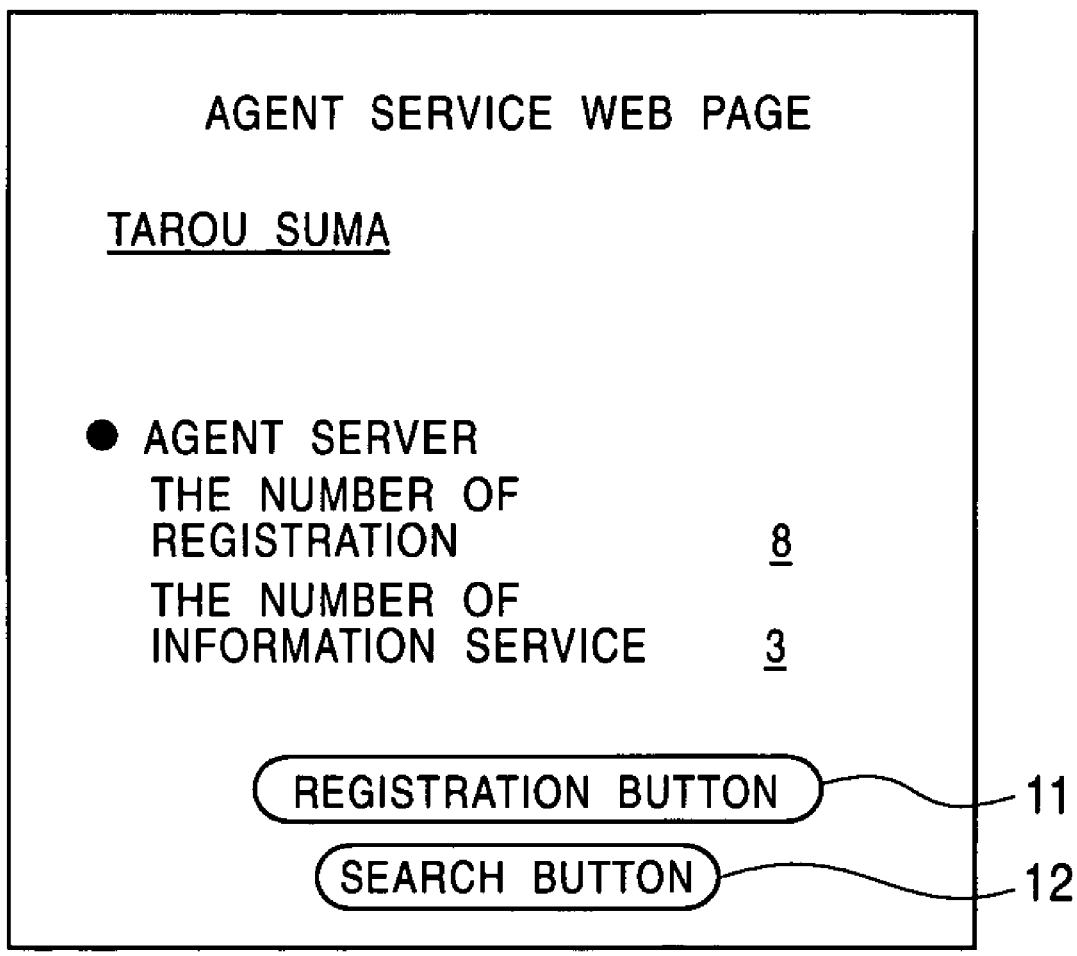
FIG. 15 shows one example of a top page at a step S53 in FIG. 14.

A set of processing from a step S51 to a step S56, inclusive, in FIG. 14 is the same processing as the set of the request information registration processing from the step S1 to the step S6, inclusive, in FIG. 2. But in a top page display processing of the step S53, a top page for member terminal like as shown in FIG. 15 is displayed. In this display example, a search button 15 is displayed in addition to the registration button 11. When the user executes to register goods to purchase, the registration button 11 is pushed as described before. But if the user executes to search the all request information from all user and corresponding all service information from shop, the search button 12 is pushed.

Consequently, the WWW browsing program checks if the registration button 11 is pushed, and if it is not pushed, the process goes to a step S57 and checks if the search button 12 is pushed. In the case when the search button 12 is not pushed, the process goes back to the step S54 and repeats these steps.

If the search button 12 is pushed at the step S57, the process goes to a step S58, and the WWW browsing program executes to display a search key designation page (not shown). The user designates a search key such as a category of goods to be searched On this search key designation page. Although not shown here, there are provided a search key and a cancel key on this search key designation page.

The WWW browsing program checks if the search button of the search key designation page is pushed, and if it is pushed, the process goes to a step S60 and executes the request information search processing and display processing.

Namely, the WWW browsing program of the member terminal 7 transmits the information of pushing the search button to the agent server 1 by way of the Internet 6. The agent server 1 executes a CGI script for search in response to this information. The CGI script for search Picks up the information matched with the search key (such as category of goods) among request information registered in the request information data base 3. Further the CGI script for search generates a HTML file for displaying thus obtained request information, and transmits thus generated HTML file to the member terminal 7 by way of the Internet. The WWW browsing program of the member terminal 7 executes to display a page corresponding to the received HTML file. Thus, as above described, an information page for displaying the search result is displayed as shown in FIG. 8.

The WWW browsing program checks if an item is selected or not among displayed search result, and if it is not selected, the process goes to a step S62, and checks if an end command is entered. In this case, if the end command is entered, the request information registration processing is over, but if it is not entered, the process goes back to the step S61 and repeats these steps.

If a proper item is selected at the step S61, the process goes to a step S63, and the WWW browsing program executes a detail display processing for the selected item.

Namely, the WWW browsing program of the member terminal 7 transmits information of the selected item to the agent server 1 by way of the Internet. The CGI script for search of the agent server 1 reads out selected request information and related service information thereto from the request information data base 3 in response to the received information for the selected item. Further the CGI script for search generates a HTML file for displaying thus readout information and transmits this HTML file to the member terminal 7 by way of the Internet. The WWW browsing program of the member terminal 7 executes to display detail of the request information and related service information on the monitor in response to the received HTML file. Thereby, a page for the detailed information is displayed as shown in FIG. 16, for example.

In this case of example in FIG. 16, contents of the request from the user and related service information from the shop are displayed.

In this example, the shop called POKO21 is offering a wear type child sheet corresponding to the requested child sheet (wear type) from the user.

Further in the contents of the offer, a direct purchase URL is displayed as same as in the case of using E-mail as described in FIG. 11. The user accesses to the direct purchase URL when the user has intention to purchase the displayed goods upon checking request from other user and related served or offered information.

For this purpose, the WWW browsing program of the member terminal 7 checks if the direst purchase URL is designated at a step S64, and if it is not designated, the process goes back to the step S61, and repeats these steps thereafter.

If designation of the direct purchase URL is done at the step S64, the process goes to a step S65, and the WWW browsing program executes a direct purchase processing. The operation of this direct purchase processing is as same as the processing explained in FIG. 12, and the explanation of this operation is omitted.

According to this example, the user of the member terminal is able to purchase desired goods utilizing the request information from other user.

A set of sequences of the processing as described above is able to be attained by a hard ware logic.

Next, various types of a recording medium are explained with reference to FIG. 17. The recording medium is used to store a series of programs (corresponding to the above described CGI script) to execute above described processing in the hard disk of the agent server 1.

Figure 17A:
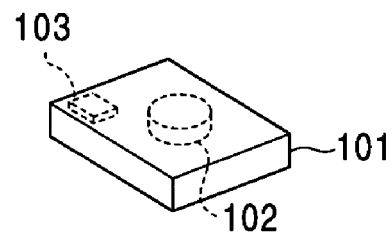
FIG. 17 shows a chart for explaining a recording medium to be used for installing a program in the agent server 1.
Figure 17B:
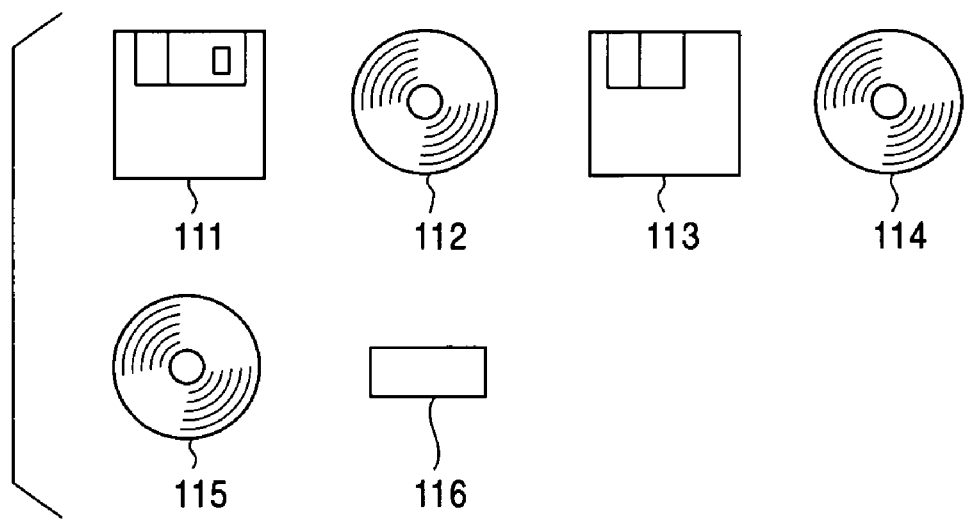
Figure 17C:
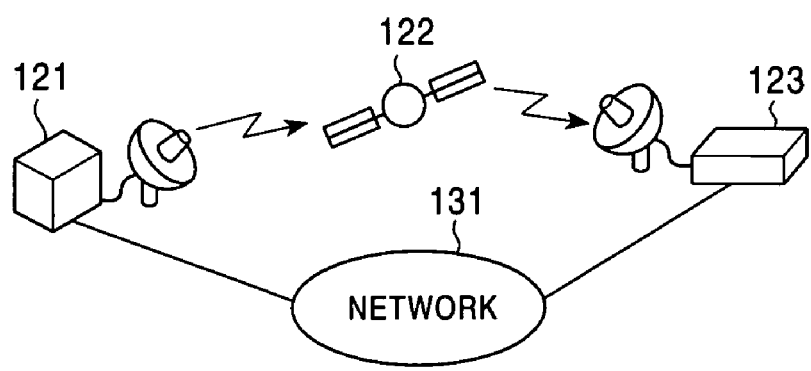

The processing program of this embodiment can be offered to any user with stored form in a hard disk 102 (equivalent to the hard disk 5) as a recording medium built in an agent server 101 (equivalent to the agent server 1) and a semiconductor memory 103 as shown in FIG. 17 (A). Or the processing program can be offered as a package software, wherein the processing program is stored temporally or permanently in a floppy disk 111, a CD-ROM (Compact Disc Read Only Memory) 112, an MO (Magneto Optical) disc 113, a DVD (Digital Versatile Disc) 114, a magnetic disc 115 or a semiconductor memory 116.

Furthermore, the processing program is transferable to an agent server 123 (equivalent to the agent server 1) by way of a satellite 122 from a download site 121 by radio as shown in FIG. 17 (C), or the program is transferred through a network 131 such as a local area network or an internet to the agent server 123 by radio or cable, then the processing program thus transferred can be stored in an installed hard disc of the agent server 123. The recording medium stated in this specification means a wide concept of wide sense to contain all types of medium as above described.

In addition, in this specification, a series of program steps served from the recording medium not only includes processing to be executed in the written order but also includes processing to be executed in parallel or individually.

In this specification, system means device group comprising more than one device.

While I have described and shown the particular embodiments of my invention, it will be understood that many modifications may be made without departing from the spirit thereof, and I contemplate by the appended claims to cover any modifications as fall within the true spirit and scope of my invention.

What is claimed is:

1. An information processing apparatus connected to a plurality of information terminals by way of a network, comprising:

storing means for storing user information;

authenticating means for authenticating a user;

recording means for recording one or more non-binding requests for an offer to sell goods transmitted by a first customer, the first customer authenticated by said authenticating means;

supplying means for supplying a service list of the non-binding requests recorded by said recording means to one or more shops, the shops being authenticated by said authenticating means;

recording means for recording submitted offers to sell goods, the submitted offers transmitted by the shops in response to the non-binding requests in said service list;

searching means for searching for the submitted offers to sell goods, in response to a demand from the first customer; and transferring means for transferring, to the first customer, a submitted requests list of the non-binding requests transmitted by the first customer;

wherein the searching means, in response to a demand from a second customer, allows the second customer to search the non-binding requests for an offer to sell goods submitted by the first customer, and wherein the transferring means transfers contents of first customer's non-binding requests to the second customer, and the second customer views and checks the contents of the first customer's non-binding requests before making a purchase.

2. The information processing apparatus according to claim 1, wherein the second customer can purchase goods using non-binding requests for an offer to sell goods from the first customer.

3. The information processing apparatus according to claim 1, wherein the user information includes a user ID, a password, and an electronic mail address.

4. The information processing apparatus according to claim 1, wherein the authenticating means uses the user information stored in the storing means to authenticate the user.

5. The information processing apparatus according to claim 1, wherein the submitted offers include direct links to web pages specified by the shops.

6. The information processing apparatus according to claim 1, wherein the submitted requests list transferred to the first customer indicates the availability of submitted offers corresponding to the non-binding requests.

7. The information processing apparatus according to claim 1, wherein the transferring means transfers the submitted requests list to the first customer using electronic mail.

8. The information processing apparatus according to claim 1, wherein the submitted offers indicate whether the corresponding shop has the goods in stock.

9. A method for processing information among a plurality of information terminals connected to a network, said method comprising the steps of:

storing user information for each of said information terminals;

authenticating a user based on said user information;

authenticating one or more shops;

recording one or more non-binding requests for an offer to sell goods transmitted by a first customer authenticated in said authenticating step, supplying a service list of the non-binding requests recorded in said recording step to the one or more shops;

recording submitted offers to sell goods transmitted by the shops in response to the non-binding requests in said service list;

searching for the submitted offers to sell goods in response to a demand from the first customer, transferring, to the first customer, a submitted requests list of the non-binding requests transmitted by the first customer; and searching, in response to a demand from a second customer, the non-binding requests for an offer to sell goods submitted by the first customer, transferring contents of first customer's non-binding requests to the second customer, wherein the second customer views and checks the contents of the first customer's non-binding requests before making a purchase.

10. The information processing method according to claim 9, including a step where the second customer purchases goods using non-binding requests for an offer to sell goods from the first customer.

11. The information processing method according to claim 9, wherein the user information includes a user ID, a password, and an electronic mail address.

12. The information processing method according to claim 9, wherein the authenticating step is done using the user information stored during the storing step.

13. The information processing method according to claim 9, wherein the submitted offers include direct links to web pages specified by the shops.

14. The information processing method according to claim 9, wherein the submitted requests list of non-binding requests transferred to the first customer indicates the availability of submitted offers corresponding to the non-binding requests.

15. The information processing method according to claim 9, wherein the step of transferring the submitted requests list to the first customer is done by electronic mail.

16. The method for processing information according to claim 9, wherein the submitted offers indicate whether the corresponding shop has the goods in stock.

* * * * *